US010604692B2

(12) United States Patent
Pearl, Jr. et al.

(10) Patent No.: US 10,604,692 B2
(45) Date of Patent: Mar. 31, 2020

(54) SUPERHYDROPHOBIC ADDITIVE

(71) Applicant: Halliburton Energy Services, Inc., Houston, TX (US)

(72) Inventors: William Cecil Pearl, Jr., Houston, TX (US); Megan R. Pearl, Houston, TX (US); Maria Paiva, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/749,004

(22) PCT Filed: Aug. 27, 2015

(86) PCT No.: PCT/US2015/047224
§ 371 (c)(1),
(2) Date: Jan. 30, 2018

(87) PCT Pub. No.: WO2017/034582
PCT Pub. Date: Mar. 2, 2017

(65) Prior Publication Data
US 2018/0320052 A1  Nov. 8, 2018

(51) Int. Cl.
*C09K 8/467* (2006.01)
*E21B 33/13* (2006.01)
*C04B 28/02* (2006.01)
*C09K 8/40* (2006.01)
(Continued)

(52) U.S. Cl.
CPC .............. *C09K 8/467* (2013.01); *C04B 28/02* (2013.01); *C09K 8/40* (2013.01); *E21B 33/13* (2013.01); *C04B 24/42* (2013.01); *C04B 2103/65* (2013.01); *C09K 2208/10* (2013.01)

(58) Field of Classification Search
CPC ........ C04B 28/02; C09K 8/467; C09K 8/487; C09K 8/508; E21B 33/138; E21B 33/14; E21B 21/003
See application file for complete search history.

(56) References Cited

U.S. PATENT DOCUMENTS 5,962,375 A    10/1999  Sawdon et al.
2006/0054321 A1  3/2006  Szymanski et al.
(Continued)

FOREIGN PATENT DOCUMENTS

CN    101863643    5/2013

OTHER PUBLICATIONS

"Superhydrophobic Silanized Melamine Sponges as High Efficiency Oil Absorbent Materials", Pham, V.H.; Dickerson, J. H. ACS Appl. Mater. Interfaces, published in 2014.
(Continued)

*Primary Examiner* — Zakiya W Bates
(74) *Attorney, Agent, or Firm* — Thomas Rooney; C. Turney Law Group PLLC

(57) ABSTRACT

A method of treating a subterranean formation includes introducing a well cementing composition into a wellbore, the cementing composition comprising: a pumpable slurry of cement and at least one of hydrophobic material, a superhydrophobic material, and combinations; and allowing at least a portion of the cementing composition to cure. A composition includes a pumpable slurry of wellbore cement and at least one of hydrophobic material, a superhydrophobic material, and combinations thereof.

15 Claims, 4 Drawing Sheets

(51) Int. Cl.
  *C04B 103/65*  (2006.01)
  *C04B 24/42*  (2006.01)

(56) References Cited

U.S. PATENT DOCUMENTS

2008/0280786 A1   11/2008  Reddy et al.
2016/0122616 A1*  5/2016  Fu .......................... E21B 33/138
                                                                166/293

OTHER PUBLICATIONS

International Search Report and Written Opinion for Application No. PCT/US2015/047224 dated May 27, 2016.

* cited by examiner

SUPERHYDROPHOBIC ADDITIVE

BACKGROUND

Cementing is a common well operation. For example, hydraulic cement compositions can be used in cementing operations in which a string of pipe, such as casing or liner, is cemented in a wellbore. The cemented string of pipe isolates different zones of the wellbore from each other and from the surface. Hydraulic cement compositions can be used in primary cementing of the casing or in completion operations. Hydraulic cement compositions can also be utilized in intervention operations, such as in plugging highly permeable zones or fractures in zones that may be producing too much water, plugging cracks or holes in pipe strings, and the like.

In performing cementing, a hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The cement composition is allowed to set in the annular space, thereby forming an annular sheath of hardened, substantially impermeable cement. The hardened cement supports and positions the pipe string in the wellbore and bonds the exterior surfaces of the pipe string to the walls of the wellbore.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

Oil contamination in cement is one problem that may occur due to the oil in the drilling fluids and/or from the formation itself. Contamination may cause the formation of large oil pockets that can hinder the set of cement. Oil contamination in cement is traditionally solved through avoidance by adding more spacer, introducing a physical barrier and/or altering the pump schedule in order to avoid and, when not possible minimize overall the contamination. These approaches only address the continuance of oil contamination and not the oil contamination already present.

Accordingly, an ongoing need exists for a method that addresses the oil contamination already present in the cement as well as the continuance of oil contamination.

BRIEF DESCRIPTION OF THE DRAWINGS

The following figure is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The present invention relates to the addition of hydrophobic/superhydrophobic additives to cement to control oil contamination, reducing porosity and permeability, enhancing durability in harsh chemical environments. The use of the hydrophobic/superhydrophobic additives may allow the cement to be contaminated by oils and oil based fluids, such as drilling muds, without compromising the structural integrity and corresponding Cement Bond Log (CBL). The method enables the cement to incorporate large amounts of oil in a highly dispersed manner, reducing the formation of large oil pockets and unset cement areas. The incorporation of oil into the cement in a controlled manner may provide unreactive physical-chemical barriers that can block the corrosive effects of chemicals within the well (i.e., $CO_2$, HCl, $H_2S$, etc.).

Figure 1:
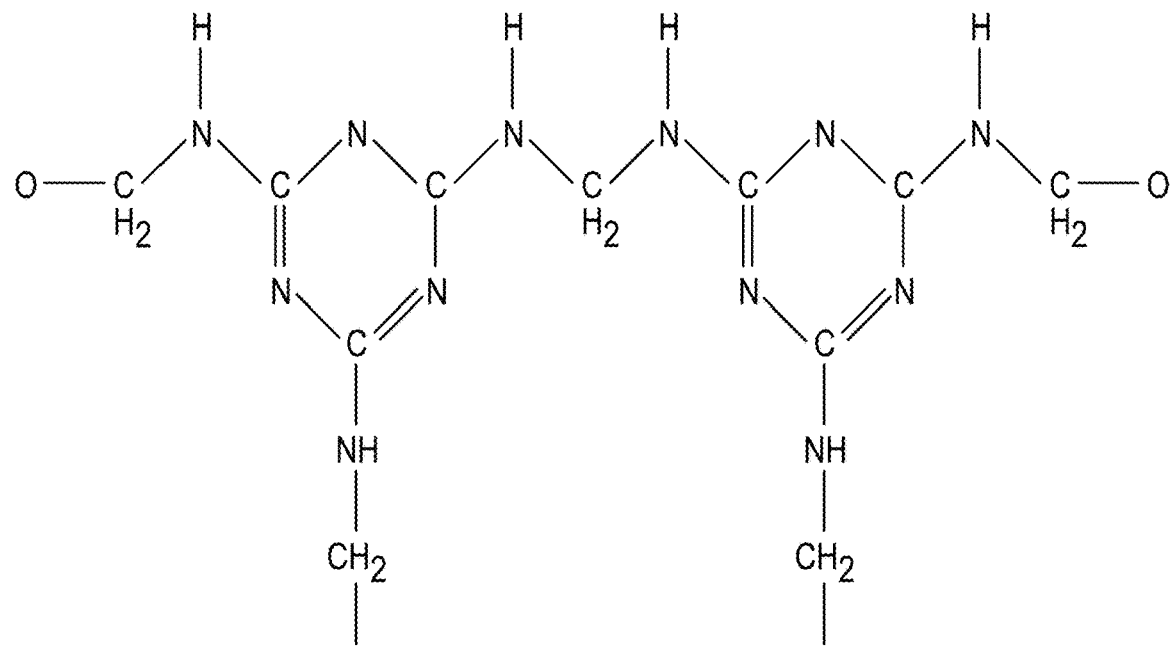
FIG. 1 is a schematic representation of the silanization of a melamine sponge according to the prior art.
Figure 1:
Figure 1:
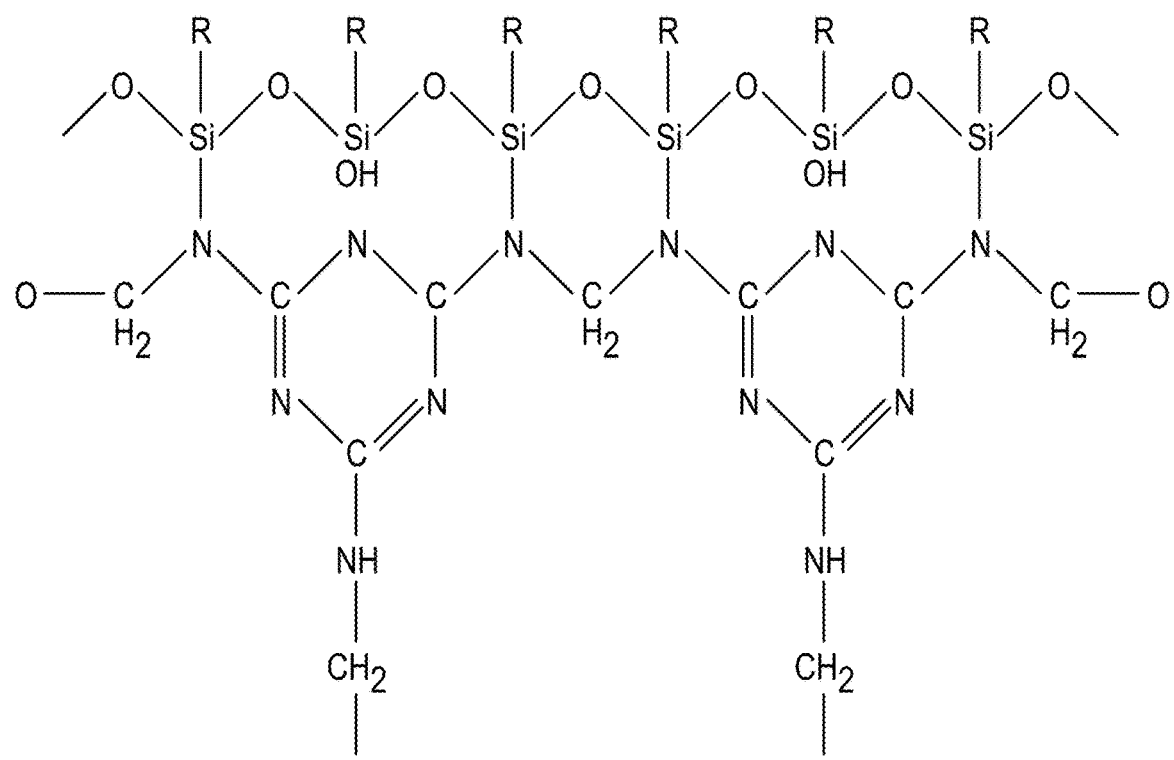

It has been shown that superhydrophobic sponges can be produced from readily available commercial sponges, such as melamine, by silanization as illustrated in FIG. 1. Other substrate materials may be used in addition to those made of melamine. These materials include but are not limited to polyacryonitrile (PAN), chitin, nanocellulose and polyurethane. In general, any electron donating site (i.e. oxygen or nitrogen in the previous example materials) to which silicon or silicon derivatives can bind may suffice.

In some embodiments, the invention is related to a method comprising: introducing a well cementing composition into a wellbore, said cementing composition comprising: a pumpable slurry of cement and at least one of a hydrophobic material, a superhydrophobic material, and combinations thereof; and allowing at least a portion of the cementing composition to cure. The at least one of hydrophobic material and superhydrophobic material may comprise a polymer sponge. In some embodiments, the sponge may comprise melamine that has been functionalized by silanization. Further, the silanization may occur through the covalent bonding of alkylsilane compounds to the secondary amine groups on the sponge. In an embodiment, the at least one of hydrophobic material and superhydrophobic material is present in the amount of about 0.01% to about 25% by weight of the cementing composition. The method may further include allowing the at least one of hydrophobic material and superhydrophobic material to absorb oil during the setting phase of the cement composition. Additionally, the method may further include a pump and a mixer for combining the components of the cementing composition and introducing the composition into the wellbore.

Several embodiments of the invention are directed to a composition for well cementing including a pumpable slurry of cement and at least one of a hydrophobic material, a superhydrophobic material, and combinations thereof. The at least one of hydrophobic material and superhydrophobic material may comprise a polymer sponge. In some embodiments, the sponge may comprise melamine that has been functionalized by silanization. Further, the silanization may occur through the covalent bonding of alkylsilane compounds to the secondary amine groups on the sponge. In an embodiment, the at least one of hydrophobic material and superhydrophobic material is present in the amount of about 0.01% to about 25% by weight of the cementing composition.

Certain embodiments of the invention are directed to a method of preparing a wellbore for cementation comprising: introducing a spacer fluid into a wellbore, said spacer fluid comprising: at least one of a water based mud, an aqueous base fluid, and combinations thereof; and at least one of a hydrophobic material, a superhydrophobic material, and combinations thereof; and allowing the spacer fluid to absorb a portion of oil in the wellbore. The at least one of hydrophobic material and superhydrophobic material may comprise a polymer sponge. In some embodiments, the sponge may comprise melamine that has been functionalized by silanization. Further, the silanization may occur through the covalent bonding of alkylsilane compounds to the secondary amine groups on the sponge. In an embodiment, the at least one of hydrophobic material and superhydrophobic material is present in the amount of about 0.01% to about 50% by weight of the spacer fluid composition. In some embodiments, at least of portion of the oil in the wellbore may be from an oil based drilling mud. The method may further comprise introducing comprising introducing a cementing composition in to the wellbore after the spacer fluid has been introduced, wherein the cementing composition comprises a pumpable slurry of cement. The cementing composition may comprise at least one of a hydrophobic material, a superhydrophobic material, and combinations thereof. The method may further include allowing the at least one of hydrophobic material and superhydrophobic material to absorb oil during the setting phase of the cement composition.

Aqueous Base Fluids

The cement slurry may include an aqueous base fluid from any source, provided that the fluids do not contain components that might adversely affect the stability and/or performance of the treatment fluids of the present invention. The aqueous base fluid may comprise fresh water, salt water, seawater, brine, or an aqueous salt solution. In the case of brines, the aqueous carrier fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

Additionally, the aqueous base fluids may be mixed with aqueous drilling mud. Water based drilling muds are known in the art, and any water based drilling mud may be used that does not interfere with the hydrophobic or superhydrophobic materials.

In certain embodiments, the water may be present in the cement or spacer composition in an amount of from about 20% to about 95% by weight of cement composition or by weight of spacer composition, from about 28% to about 90% by wt. of cement composition, or from about 36% to about 80% by wt. of cement composition or spacer composition.

Cementitious Materials

A variety of cements can be used in the present invention, including cements comprised of calcium, aluminum, silicon, oxygen, and/or sulfur which set and harden by reaction with water. Such hydraulic cements include Portland cements, pozzolan cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. Portland cements that may be suited for use in embodiments of the present invention may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present invention may be classified as ASTM Type I, II, or III. The cementitious materials may be combined with the aqueous base fluids to form a cement slurry.

Slurry Density

In certain embodiments, the cement compositions have a slurry density which is pumpable for introduction down hole. In exemplary embodiments, the density of the cement composition in slurry form is from about 7 pounds per gallon (ppg) to about 20 ppg, from about 8 ppg to about 18 ppg, or from about 9 ppg to about 17 ppg.

Hydrophobic and Superhydrophobic Materials

Generally, the materials useful in the invention will be ones that are hydrophobic or superhydrophobic and absorb oil with very little to no absorption of water. A hydrophobic surface is generally one that has a water contact angle (CA) greater than 90°. Superhydrophobic surfaces are generally those with a water CA greater than 150°. These materials, including their coatings or other properties that make them hydrophobic or superhydrophobic, should also have the strength to survive in cement that is pumped into a wellbore during cementing operations. Commercially available sponges that have been modified and/or functionalized to include hydrophobic or superhydrophobic qualities, and those which have inherent hydrophobic or superhydrophobic qualities, may be used.

Polymer substrates may include those made from polyacryonitrile (PAN), chitin, nanocellulose, polyurethane, carbon nanotubes and graphene, and combinations thereof.

The surfaces of these polymers may be modified by coating (i.e. layering, vapor deposition, electroless deposition, electrochemical deposition, etc.) using hydrophobic polymers, superhydrophobic activated carbon, carbon nanotubes, graphene, alternating layers of different sized particles (i.e. nanosilica and microsilica), metal containing compounds or organometallic compounds.

Polyurethane sponges may be modified by utilizing electroless deposition of a film of copper, and then adding superhydrophobic coatings using solution-immersion processes. See Zhu, Q.; Pan, Q.; Liu, F., *Facile Removal and Collection of Oils from Water Surfaces through Superhydrophobic and Superoleophilic Sponges*, J. Phys. Chem. C 2011, 115, 17464-17470.

In addition to chemical modification of the surface, structural modifications can also induce or enhance hydrophobicity or superhydrophobicity. Some available structural modification methods include anodic oxidation, etching, lithography, templating, electrospinning, solgel, and combinations thereof.

An exemplary material for use in this disclosure is that of a melamine sponge modified through silanization. The process involves immersing a melamine sponge in a solution of octadecyltrichlorosilane and tolune. Melamine sponges are basically a formaldehyde/melamine/sodium bisulfite copolymer, and the silanization occurs through the covalent bonding of alkylsilane compounds to the secondary amine groups on the sponge. This process is known in the art and demonstrated in Pham, V. H.; Dickerson, J. H., *Superhydrophobic Silanized Melamine Sponges as High Efficiency Oil Absorbent Materials*, ACS Appl. Mater. Interfaces, 2014.

These functionalized superhydrophobic sponges may be able to absorb oil with a capacity of up to 163 times their weight.

The functionalized hydrophobic or functionalized superhydrophobic material may be present in the amount of about 0.01% to about 25% by weight of the cementing composition. When used in a spacer fluid, the functionalized hydrophobic or functionalized superhydrophobic material may be present in the amount of about 0.01% to about 50% by weight of the spacer fluid.

Spacer Fluids

The disclosure is also directed to the use of a spacer fluid in preparing a wellbore for cementation. Spacer fluids may be used to remove oil based muds that are present in the formation after drilling operations or oil from the formation itself. The spacer fluid may include at least one of a water based mud, an aqueous base fluid, and combinations thereof. The spacer fluid also includes a functionalized hydrophobic or functionalized superhydrophobic material as discussed in the section above. The spacer fluid will immediately absorb oil as it is placed in the wellbore. In an embodiment, the functionalized hydrophobic or functionalized superhydrophobic material is present in the amount of about 0.01% to about 50% by weight of the spacer fluid composition.

Cement Additives

The cement compositions of the invention may contain additives. In certain embodiments, the additives comprise at least one of resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, gas migration control additives, formation conditioning agents, and combinations thereof.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

As will be appreciated by those of ordinary skill in the art, embodiments of the cement compositions of the present invention may be used in a variety of subterranean applications, including primary and remedial cementing. For example, a cement slurry composition comprising cement, a polymer, and water may be introduced into a subterranean formation and allowed to set or cure therein. In certain embodiments, for example, the cement slurry composition may be introduced into a space between a subterranean formation and a pipe string located in the subterranean formation. Embodiments may further comprise running the pipe string into a wellbore penetrating the subterranean formation. The cement slurry composition may be allowed to set or cure to form a hardened mass in the space between the subterranean formation and the pipe string. In addition, a cement composition may be used, for example, in squeeze-cementing operations or in the placement of cement plugs. Embodiments of the present invention further may comprise producing one or more hydrocarbons (e.g., oil, gas, etc.) from a well bore penetrating the subterranean formation.

Figure 2:
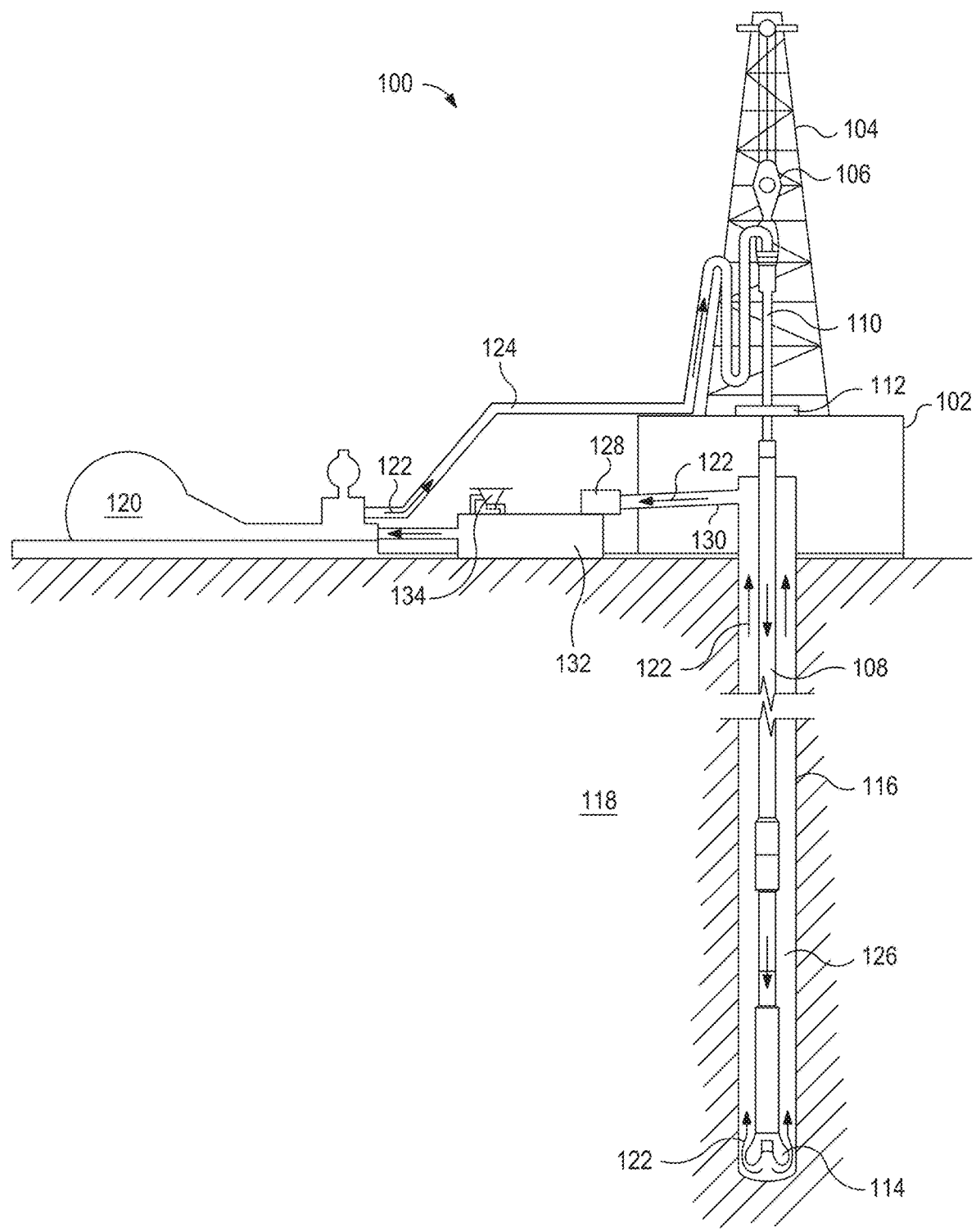
FIG. 2 depicts an embodiment of a system configured for delivering the cements and spacer fluids described herein to a downhole location.

The exemplary cement compositions disclosed herein may directly or indirectly affect one or more components or pieces of equipment associated with the preparation, delivery, recapture, recycling, reuse, and/or disposal of the disclosed cement compositions. For example, and with reference to FIG. 2, the disclosed cement compositions may directly or indirectly affect one or more components or pieces of equipment associated with an exemplary wellbore drilling assembly 100, according to one or more embodiments. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed cement compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed cement compositions may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed cement compositions may be stored, reconditioned, and/or regulated until added to the drilling fluid 122.

As mentioned above, the disclosed cement compositions may directly or indirectly affect the components and equipment of the drilling assembly 100. For example, the disclosed cement compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary cement compositions.

The disclosed cement compositions may directly or indirectly affect the pump 120, which representatively includes any conduits, pipelines, trucks, tubulars, and/or pipes used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The disclosed cement compositions may also directly or indirectly affect the mixing hopper 134 and the retention pit 132 and their assorted variations.

The disclosed cement compositions may also directly or indirectly affect the various downhole equipment and tools that may come into contact with the cement compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed cement compositions may also directly or indirectly affect any downhole heat exchangers, valves and corresponding actuation devices, tool seals, packers and other wellbore isolation devices or components, and the like associated with the wellbore 116. The disclosed cement compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed cement compositions may also directly or indirectly affect any transport or delivery equipment used to convey the cement compositions to the drilling assembly 100 such as, for example, any transport vessels, conduits, pipelines, trucks, tubulars, and/or pipes used to fluidically move the cement compositions from one location to another, any pumps, compressors, or motors used to drive the cement compositions into motion, any valves or related joints used to regulate the pressure or flow rate of the cement compositions, and any sensors (i.e., pressure and temperature), gauges, and/or combinations thereof, and the like.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

Sponge Water Absorption

Figures 3A, 3B:
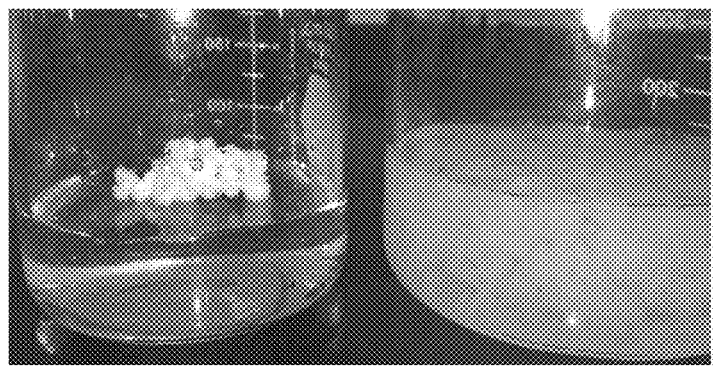
FIGS. 3A,B show a functionalized sponge material and an un-functionalized sponge material in water.

Melamine sponges were obtained in a nonfunctionalized state and were functionalized to a superhydrophobic state by submersion in 5% wt octadecyltrichlorosilane in toluene for 30 minutes. The functionalized sponges were rinsed in toluene and dried at 120° F. for 1 hour. The functionalized sponges were cut into small pieces to allow for easy integration into a fluid system. Samples of non-functionalized and functionalized sponge were placed in room temperature water. FIG. 3A shows that the functionalized material is not compatible with water because it is floating on the surface, while the non-functionalized material readily absorbs water and sinks as seen in FIG. 3B.

Example 2

Sponges in Cement

Figure 4A:
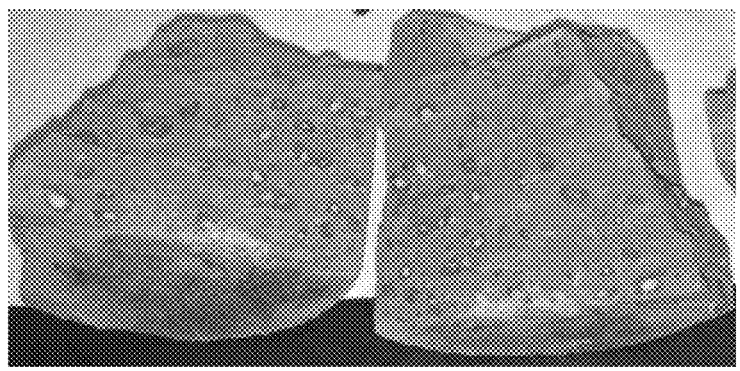
FIGS. 4A,B show the distribution of superhydrophobic particles in a neat cement matrix exposed to a base oil while conditioning.
Figure 4B:
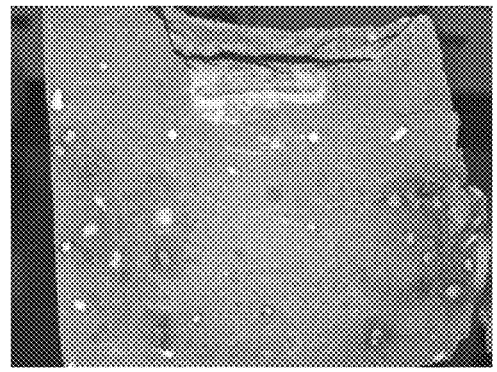
Figure 5:
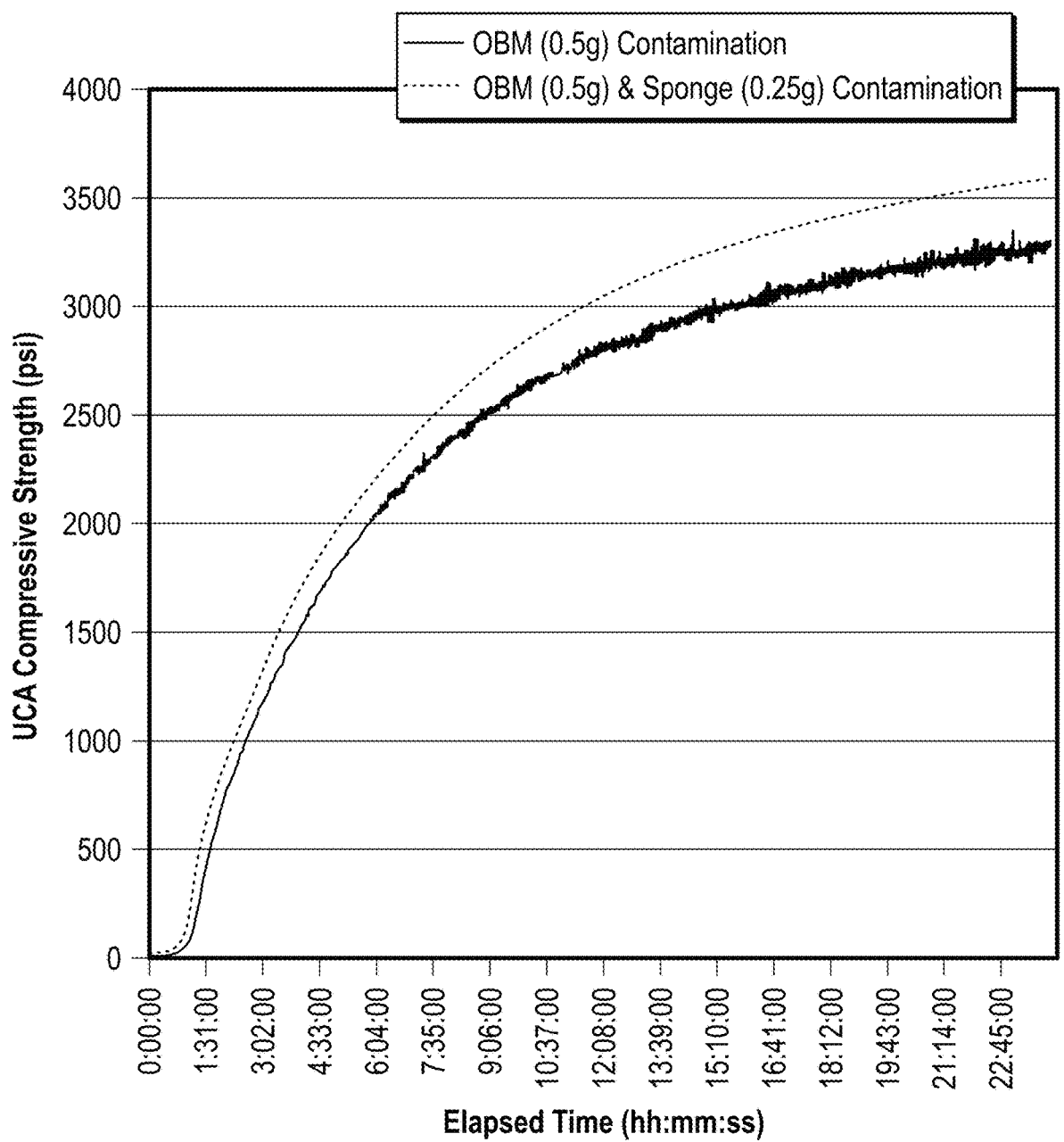
FIG. 5 shows the ultrassonic compressive strength (UCS) of two slurries contaminated with oil-based mud (OBM), without and with funtionalized sponge, demonstrating the effect of the functionalized sponge.

An amount of 0.05% BWOC of the functionalized superhydrophobic material, as previously described on Sponge Water Absorption section, was added to a cement slurry composed of Class G cement and water mixed at 16.4 ppg density. The slurry-sponge mixture was placed in an atmospheric consistometer with 0.5 g oil based fluid and conditioned at room temperature for 30 minutes. The conditioned slurry was then placed in an autoclave and heated to 160° F. over 30 minutes at 3000 psi. The slurry was left to cure for 24 hours. The functionalized sponge has the ability to absorb 100 times its weight in various organic solvents and oils. As shown in FIGS. 4A,B, the addition of the functionalized sponge results in an even dispersion of the oil contamination, without compromising the slurry mixability and compressive strenght delevopment, by eliminating the formation of large oil pockets that can hinder the set of cement. The dark areas surrounding the sponge particles indicate preferential absorption of oil. FIG. 5 shows the ultrasonic compressive strength (UCS) of two slurries contaminated with oil-based mud (OBM), without and with a funtionalized sponge, demonstrating the effect of the functionalized sponge. Improved results in compressive strength development were observed by UCA with the addition of the superhydrophobic material in the presence of oil based drilling mud. One of skill in the art may realize that the use of superhydrophobic material, as demonstrated in the data plotted in FIG. 5, but not limited thereto, may be utilized in downhole operations such as wellbore cementing, with the expectation of enhancing the resulting cement such that it may have improved compressive strength and fewer large oil pockets of contamination.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Embodiments disclosed herein include:

A: A method comprising: introducing a well cementing composition into a wellbore, said cementing composition comprising: a pumpable slurry of cement and at least one of a hydrophobic material, a superhydrophobic material, and combinations thereof; and allowing at least a portion of the cementing composition to cure.

B: A composition for well cementing comprising: a pumpable slurry of wellbore cement and at least one of a hydrophobic material, a superhydrophobic material, and combinations.

C: A method of preparing a wellbore for cementation comprising: introducing a spacer fluid into a wellbore, said spacer fluid comprising: at least one of a water based mud, an aqueous base fluid, and combinations thereof and at least one of a hydrophobic material, a superhydrophobic material, and combinations thereof; and allowing the spacer fluid to absorb a portion of oil in the wellbore.

Each of embodiments A, B and C may have one or more of the following additional elements in any combination: Element 1: wherein the at least one of hydrophobic material and superhydrophobic material is a polymer modified by at least one of coating, anionic oxidation, etching, lithography, templating, electrospinning, solgel, and combinations thereof. Element 2: wherein the polymer comprises at least one of polyacryonitrile, chitin, nanocellulose, polyurethane, carbon nanotubes and graphene, and combinations thereof. Element 3: wherein the at least one of hydrophobic material and superhydrophobic material comprises a polymer sponge. Element 4: wherein the sponge comprises melamine that has been functionalized by silanization. Element 5: wherein the silanization occurs through the covalent bonding of alkylsilane compounds to the secondary amine groups on the sponge. Element 6: wherein the at least one of hydrophobic material and superhydrophobic material is present in the amount of about 0.01% to about 25% by weight of the cementing composition. Element 7: further comprising allowing the at least one of hydrophobic material and superhydrophobic material to absorb oil during the setting phase of the cement composition. Element 8: further comprising at least one of a pump, a mixer, and combinations thereof for combining the components of the cementing composition and introducing the composition into the wellbore. Element 9: wherein the at least one of hydrophobic material and superhydrophobic material is present in the amount of about 0.01% to about 50% by weight of the spacer fluid composition. Element 10: wherein at least a portion of the oil in the wellbore is from an oil based drilling mud. Element 11: further comprising introducing a cementing composition in to the wellbore after the spacer fluid has been introduced, wherein the cementing composition comprises a pumpable slurry of a wellbore cement. Element 12: wherein the cementing composition comprises at least one of hydrophobic material, a superhydrophobic material, and combinations thereof.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method comprising:
   introducing a spacer fluid into a wellbore, said spacer fluid comprising:
   at least one of a water based mud, an aqueous base fluid, and combinations thereof; and
   at least one of hydrophobic material, a superhydrophobic material, and combinations thereof;
   allowing the spacer fluid to absorb a portion of oil in the wellbore;
   introducing a well cementing composition into a wellbore, said cementing composition comprising:
   a pumpable slurry of cement; and
   at least one of a hydrophobic material, a superhydrophobic material, and combinations thereof, wherein the at least one of hydrophobic material and superhydrophobic material is a polymer modified by at least one of coating, anionic oxidation, etching, lithography, templating, electrospinning, solgel, and combinations thereof, and wherein the at least one of hydrophobic material and superhydrophobic material comprises a polymer sponge; and
   allowing at least a portion of the cementing composition to cure.

2. The method of claim 1, wherein the polymer comprises at least one of polyacryonitrile, chitin, nanocellulose, polyurethane, carbon nanotubes and graphene, and combinations thereof.

3. The method of claim 1, wherein the sponge comprises melamine that has been functionalized by silanization.

4. The method of claim 3, wherein the silanization occurs through the covalent bonding of alkylsilane compounds to the secondary amine groups on the sponge.

5. The method of claim 1, wherein the at least one of hydrophobic material and superhydrophobic material is present in the amount of about 0.01% to about 25% by weight of the cementing composition.

6. The method of claim 1, further comprising allowing the at least one of hydrophobic material and superhydrophobic material to absorb oil during the setting phase of the cement composition.

7. The method of claim 1, further comprising at least one of a pump, a mixer, and combinations thereof for combining the components of the cementing composition and introducing the composition into the wellbore.

8. A method of preparing a wellbore for cementation comprising:
   introducing a spacer fluid into a wellbore, said spacer fluid comprising:
   at least one of a water based mud, an aqueous base fluid, and combinations thereof; and
   at least one of hydrophobic material, a superhydrophobic material, and combinations thereof, wherein the at least one of hydrophobic material and superhydrophobic material is a polymer modified by at least one of coating, anionic oxidation, etching, lithography, templating, electrospinning, solgel, and combinations thereof, and wherein the at least one of hydrophobic material and superhydrophobic material comprises a polymer sponge; and
   allowing the spacer fluid to absorb a portion of oil in the wellbore.

9. The method of claim 8, wherein the polymer comprises at least one of polyacryonitrile, chitin, nanocellulose, polyurethane, carbon nanotubes and graphene, and combinations thereof.

10. The method of claim 8, wherein the sponge comprises melamine that has been functionalized by silanization.

11. The method of claim 10, wherein the silanization occurs through the covalent bonding of alkylsilane compounds to the secondary amine groups on the sponge.

12. The method of claim 8, wherein the at least one of hydrophobic material and superhydrophobic material is present in the amount of about 0.01% to about 50% by weight of the spacer fluid composition.

13. The method of claim 8, wherein at least a portion of the oil in the wellbore is from an oil based drilling mud.

14. The method of claim 8, further comprising introducing a cementing composition in to the wellbore after the spacer fluid has been introduced, wherein the cementing composition comprises a pumpable slurry of a wellbore cement.

15. The method of claim 14, wherein the cementing composition comprises at least one of hydrophobic material, a superhydrophobic material, and combinations thereof.

* * * * *